US011186152B2

(12) United States Patent
Slinger et al.

(10) Patent No.: US 11,186,152 B2
(45) Date of Patent: Nov. 30, 2021

(54) TONNEAU COVER AND SEALING GASKET FOR SAME

(71) Applicant: Lund, Inc., Buford, GA (US)

(72) Inventors: Christopher Slinger, Howe, IN (US); Dean Mettler, Howe, IN (US)

(73) Assignee: Lund, Inc., Buford, GA (US)

( * ) Notice: Subject to any disclaimer, the term of this patent is extended or adjusted under 35 U.S.C. 154(b) by 0 days.

(21) Appl. No.: 16/840,875

(22) Filed: Apr. 6, 2020

(65) Prior Publication Data

US 2020/0331330 A1 Oct. 22, 2020

Related U.S. Application Data

(63) Continuation of application No. 15/962,248, filed on Apr. 25, 2018, now Pat. No. 10,647,187.

(60) Provisional application No. 62/491,134, filed on Apr. 27, 2017, provisional application No. 62/547,563, filed on Aug. 18, 2017.

(51) Int. Cl.
| | |
|---|---|
| *B60J 7/14* | (2006.01) |
| *B60J 7/16* | (2006.01) |
| *B60J 10/90* | (2016.01) |
| *B60J 10/35* | (2016.01) |
| *B60J 10/30* | (2016.01) |
| *B60J 10/80* | (2016.01) |
| *B60J 10/18* | (2016.01) |
| *B60J 10/16* | (2016.01) |

(52) U.S. Cl.
CPC ............ *B60J 7/1607* (2013.01); *B60J 7/141* (2013.01); *B60J 10/16* (2016.02); *B60J 10/18* (2016.02); *B60J 10/30* (2016.02); *B60J 10/35* (2016.02); *B60J 10/80* (2016.02); *B60J 10/90* (2016.02)

(58) Field of Classification Search
CPC ............ B60J 7/085; B60J 7/102; B60J 7/141; B60J 7/1607; B60J 10/16; B60J 10/18; B60J 10/23; B60J 10/35; B60J 10/80; B60J 10/90
USPC ............. 296/100.02, 100.06, 100.17, 136.03
See application file for complete search history.

(56) References Cited

U.S. PATENT DOCUMENTS

| | | | |
|---|---|---|---|
| 4,860,495 A | 8/1989 | Kessler | |
| 6,053,557 A * | 4/2000 | Kooiker | B60J 7/141 296/100.06 |
| 6,942,225 B2 | 9/2005 | Gentemann et al. | |
| 7,252,322 B2 | 8/2007 | Rusu | |

(Continued)

*Primary Examiner* — Jason S Daniels
(74) *Attorney, Agent, or Firm* — Knobbe, Martens, Olson & Bear, LLP

(57) ABSTRACT

A tonneau cover can include a frame, a cover, and a gasket configured to be positioned between a portion of the frame and a portion of the vehicle and further configured to reduce liquid passage between the portion of the frame and the portion of the vehicle. In some embodiments, the gasket includes a compression portion and an attachment portion configured to connect with the portion of the frame. The attachment portion can include a first portion, a second portion, and a third portion positioned between the first and second portions and having a greater thickness than both of the first and second portions. The compression portion can be positioned between the attachment portion and the portion of the vehicle when the tonneau cover is in use, and the compression portion can include at least one bulb having a hollow passage extending along the length of the gasket.

19 Claims, 11 Drawing Sheets

(56) References Cited

U.S. PATENT DOCUMENTS

| | | |
|---|---|---|
| 8,262,148 B2 | 9/2012 | Rusher et al. |
| 8,336,946 B2 | 12/2012 | Schrader et al. |
| 2001/0005960 A1 | 7/2001 | Yamaguchi et al. |
| 2008/0106114 A1 | 5/2008 | Wheatley |
| 2008/0231073 A1* | 9/2008 | Essig .................. B60J 7/102 296/121 |
| 2013/0341960 A1 | 12/2013 | Garska |
| 2018/0147925 A1 | 5/2018 | Williamson et al. |
| 2019/0100087 A1* | 4/2019 | Facchinello ............ B60J 7/141 |

\* cited by examiner

TONNEAU COVER AND SEALING GASKET FOR SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally vehicle tonneau covers, such as gaskets for waterproofing/watersealing tonneau covers.

SUMMARY

Disclosed herein are embodiments of a tonneau cover which can comprise a frame, a bed cover portion located within the frame, and a gasket to form a watertight seal between the frame and a vehicle, the gasket can comprise an attachment portion, the attachment portion including at least one protrusion extending from a top portion of the attachment portion and configured to connect with the frame, and a compression portion attached to the attachment portion and configured to contact a portion of the vehicle, wherein the compression portion is configured to deform between the tonneau cover and the vehicle to resist water entry between the gasket and the vehicle, wherein the attachment portion is less compressible than the compression portion.

In some embodiments, the compression portion can comprise at least one bulb seal. In some embodiments, the compression portion can comprise two bulb seals. In some embodiments, the attachment portion can be a different material than the compression portion. In some embodiments, the attachment portion can comprise a middle hooked protrusion extending from the top surface and a pair of outside hooks extending from the top surface. In some embodiments, the tonneau cover can further comprise an adhesive on the top surface.

In some embodiments, the compression portion can be a first rubber material and the attachment portion is a second rubber material, the second rubber material being harder and denser than the first rubber material. In some embodiments, the gasket can extend along an entire length of a side of the frame. In some embodiments, the compression portion can compressibly deform to form a watertight seal.

In some embodiments, the attachment portion can comprise a pair of arms extending outward from a stop component, and the compression portion can comprise a pair of bulb seals, each of the bulb seals being located below each of the arms.

In some embodiments, the compression portion can comprise a bulb seal having a foot protruding downwards and away from the bulb seal, the foot configured to improve water sealability of the gasket, and wherein the gasket is configured to be located entirely on a top surface of a bulkhead of the vehicle.

In some embodiments, the compression portion can comprise a v-shaped component, a ball on a point of the v-shaped component, and an arm extending away from the v-shaped component and having a fin extending downwards, the ball configured to abut an inner surface of a tailgate of the vehicle and the arm configured to be located on an upper surface of the tailgate.

Also disclosed herein are embodiments of a gasket for improving water sealing of a tonneau cover, the gasket can comprise an attachment portion, the attachment portion comprising a first interference connector extending upwards from a top surface of the attachment portion and a pair of outer interference connectors extending upwards from the top surface and located on generally opposite ends of a width of the attachment portion, the first interference connector and pair of outer interference connectors configured to connect to a frame of a tonneau cover, and a compression portion attached to the attachment portion below the attachment portion, the compression portion configured to compressibly deform to resist water entry around the gasket, wherein the attachment portion is formed from a material that is more dense and less compressible than a material forming the compression portion.

In some embodiments, the attachment portion can comprise a pair of arms extending outward from a stop component, the compression portion can comprise a pair of bulb seals, each of the bulb seals being located below each of the arms and at least partially attached to each of the arms, and the stop component can provide for a limit to the deformation of the pair of bulb seals. In some embodiments, the compression portion can comprise a bulb seal having a foot protruding downwards and away from the bulb seal in an uncompressed configuration. In some embodiments, the compression portion can comprise a v-shaped component, a ball-like structure on a point of the v-shaped component, and an arm extending away from the v-shaped component and having a fin extending downwards.

In some embodiments, the attachment portion can comprise a first rubber and the compression portion can comprise a second rubber, the first rubber being different from the second rubber. In some embodiments, the gasket can further comprise an adhesive on the top surface. In some embodiments, the top surface can comprise a plurality of raised surfaces and a plurality of lowered surfaces.

In some embodiments, the interference connector can extend upwards from one of the plurality of raised surfaces.

DETAILED DESCRIPTION

Figure 1:
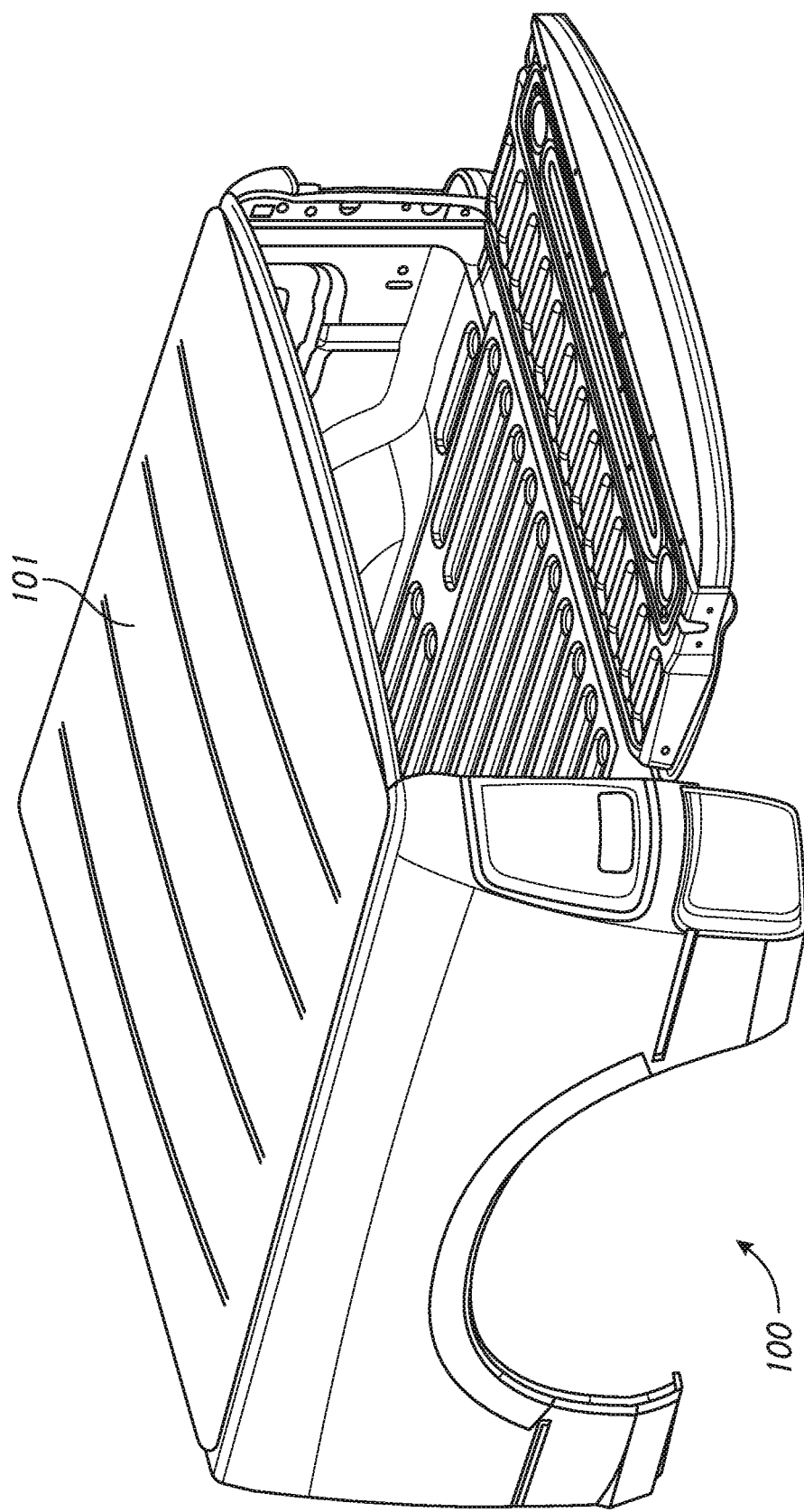
FIG. 1 illustrates an embodiment of a tonneau cover on a vehicle.

Disclosed herein are embodiments of tonneau covers having one or more gaskets (e.g., seals). An example tonneau cover is shown in FIG. 1 wherein the cover 101 is located on a truck bed 100. The gaskets can advantageously improve sealing between a tonneau cover 101 and a vehicle body/frame, specifically the truck bed 100 of the vehicle. For example, gaskets can be used to seal the bulkhead towards the cab of the vehicle, the side rails, and/or the tailgate. In some embodiments, the gaskets can significantly reduce leakage, such as water leakage, into the truck bed, thereby preventing water damage to any items held within the truck bed. In some embodiments, the disclosed gaskets can resist water entry between the gasket and the vehicle. In some embodiments, the disclosed gaskets can be watertight.

Previous tonneau covers in the marketplace did not work well with all truck beds to due variations in the design of the beds based on the company and type of truck. For example, the bed dimensions/sizes can vary between vehicles even off the same production line. Further, some bed tops have bedrail caps installed with raised ribs, or bedrail caps installed that are not flat, or no bedrail caps at all, leading to variations in the size of the truck bed. Moreover, bedrail caps with ribs can have different designs, with different rib sizes and locations. Thus, individual gaskets would need to be used in very particular circumstances, and there was no "universal" style gasket for the different areas of the tonneau cover.

In addition, sealing of tonneau covers can be difficult as beds are no longer perfectly rectangular in shape, they tend to have a more trapezoidal shape, and following a seal perfectly along this shaped truck bed rail can be difficult. Accordingly, currently used tonneau covers known in the art do not perform well in keeping out water due to the variations of size and dimensions of vehicles.

Disclosed herein are embodiments of tonneau covers incorporating gasket which can be flexible and can seal in the right locations along the truck bed to significantly limit water leakage into the bed no matter what the bed variations are. Thus, embodiments of the disclosure can be used on multiple types of truck beds and are not limited to one particular brand or design and can be more "universal" than gaskets known in the art.

In some embodiments, the size, durometer and structure of the disclosed gaskets can be different based on the weight of the tonneau cover and clamping (e.g., closing) mechanism and can provide a tight seal in the proper location for any bed configuration. The gaskets can be formed of a compressible material, such as rubber, plastic, cloth, polymer, etc., and when compressed between the tonneau cover and the vehicle frame can provide for a watertight seal. The type of material used does not limit the disclosure, and a number of other materials can be used.

Table I shows properties for example embodiment of a soft rubber that can be used in embodiments of the disclosure.

TABLE I

| Test Method | Property | Requirement | Comments |
|---|---|---|---|
| RM200510 Physical Properties | | | |
| Original Physical Properties | | | |
| ASTM D1056 | Density | Report in g/cm3 | ASTM D1056, Sections 62-67 |
| Compression Deflection | | | |
| ASTM D575 | 25% Deflection | 91-168 kPa (13-24 psi) | ASTM D1056, Sections 17-22 |
| Compression Deflection after Oven Aging: 70 hr @ 100° C. | | | |
| ASTM D865 | 25% Deflection 180° Bend | 0 to +70 kPa (0-10 psi) No Cracks | ASTM D1056, Sections 35-41 |
| Compression Set Testing: 22 hr @ 70° C. | | | |
| ASTM D395 | 50% Compression | 25% max | Method B |
| Dimensional Stability: 70 hr @ 100° C. | | | |
| ASTM D865 | Change in length & breath dimensions | 4% max | ASTM D509, Section 11.4 |
| Ozone Resistance: 100 hrs @ (See Below) pphm, 40° C. | | | |
| ASTM D1149 | Type I: 100 pphm | No Cracks or Crazing | Method B, Procedure B1, 40% elongation |
| ASTM D1149 | Type I: 100 pphm | No Cracks or Crazing | Method B, Procedure B1, 40% elongation |
| **Please test to Type 11. | | | |
| Fluid Immersion: Water Absorption | | | |
| ASTM C1083 | Change in mass | 5% max | |
| Low Temperature Brittleness | | | |
| ASTM C509 | 5 hr @ −40° C. | No Cracks or Failure | ASTM C509, Appedix X1 |

TABLE I-continued

RM200510 Physical Properties

| Test Method | Property | Requirement | Comments |
|---|---|---|---|
| | Migration Stain | | |
| ASTM D925 | 48 hr w/UVA-340 Bulb | No Migration Staining | Method B, Please list paint used on plate |
| | Flame Propagation | | |
| FMVSS 302 | Burn Rate | Report Only | |

ASTM C509, Option 11
Flammability
Changed Comp/Set to 50% deflection. Recovery 25% max
Entered line item to report density of sponge sample Table II shows properties an example embodiment of a dense rubber that can be used in embodiments of the disclosure.

TABLE II

RM270864 Physical Properties

| Test Method | Property | Requirement | Comments |
|---|---|---|---|
| | Original Physical Properties | | |
| ASTM D412 | Tensile | 1800 psi (12.4) min | 20"/minute, Die C |
| ASTM D412 | Elongation | 200% min | 20"/minute, Die C |
| ASTM D2240 | Hardness | 70 ± 5 | Type A Durometer |
| | Heat Aging 70 hrs @ 100° C. | | |
| ASTM D573 | Change in Tensile | −15% max | 20"/minute. Die C |
| | Change in Elongation | −40% max | 20"/minute, Die C |
| | Change in Hardness | +10 pts max | Type A Durometer |
| | Compression Set Testing | | |
| ASTM D395 22 hrs @ 100° C. | Solid Button | 30% max | Method B, Type 1 |
| | Tear Strength | | |
| ASTM D624 | | 100 ppi (17.5 kN/m) | 20"/minute, Die C |
| | Ozone Resistance: 100 hrs @ 100 pphm, 40° C. | | |
| ASTM D1149 | | No Cracks or Crazing | Method B, Procedure B1, 20% elongation |
| | Brittleness Temperature | | |
| ASTM D746 | −40° C. maximum | Pass | Procedure A (10.1), Type II Specimen |

Please list actual temperature, number of specimens tested and number of failures

| | Migration Stain | | |
|---|---|---|---|
| ASTM D925 | 48 hr w/UVA-340 Bulb | No Migration Staining | Method B, Please list paint used on plate |

ASTM C864, Option II

Table III shows properties an example embodiment of a rubber for hinges that can be used in embodiments of the disclosure.

TABLE III

RM200337/BRM203100 Physical Properties

| Test Method | Property | Requirement | Comments |
|---|---|---|---|
| *Original Physical Properties* | | | |
| ASTM D1056 | Density | 0.2 + 0.15/−0.05 g/cm3 | ASTM D1056, Sections 62-68 |
| ASTM D1056 | Density | 0.3 + 0.15/−0.05 g/cm3 | ASTM D1056, Sections 62-68 |
| *Compression Deflection* | | | |
| ASTM D575 | 25% Deflection | 35-65 kPa (5-9 psi) | ASTM D1056, Sections 16-23 |
| *Compression Deflection after Oven Aging: 168 hr @ 70° C.* | | | |
| ASTM D573 | 25% Deflection | ±30% | ASTM D1056, Sections 35-42 |
| *Compression Set Testing: 22 hr @ RT* | | | |
| ASTM D395 | 50% Compression | 25% max | ASTM D1056, Sections 49-55 |
| *Compression Set Testing: 46 hr @ RT* | | | |
| ASTM D395 | 50% Compression | 50% min | ASTM D6576, Section 14 |
| *Water Absorption* | | | |
| ASTM D1056 | Change in Mass | 5% max | ASTM D1056, Sections 43-49 |
| *Fluid Immersion: Fuel B; 7 days @ RT* | | | |
| ASTM D471 | Change in mass | 150% max | ASTM D1056, Sections 27-34 |
| *Flammability* | | | |
| FMVSS 302 | Burn Rate | 100 mm/minute max | |
| *Low Temperature Resistance, Flex, −40° C.* | | | |
| ASTM D6576 | 180° bend on mandrel | No Cracking | ASTM D1056, Sections 57-61 |
| *Shrinkage, 7 days @ 70° C.* | | | |
| ASTM D6576 | | 10% max | ASTM D6576, Section 16 |

ASTM D1056 2C2
SAE J18B SCE-42, B-Compression Set
Closed Cell EPDM Sponge: Density 0.2 + 0.15/−0.05 g/cm3
EPDM Foam: Density 0.3 + 0.15/−0.05 g/cm3
Flammability
ASTM D6576 Type II, Grade B In some embodiments, the disclosed gaskets may contain one, two, or all three of the above-disclosed rubbers. In some embodiments, the disclosed gaskets can contain different materials than disclosed above. The particular materials do not limit the disclosure. Further, all of the above-referenced ASTM standards are incorporated by reference in their entirety.

Discussed in detail below are a number of different types of seals for different portions of the tonneau cover. Specifically, a bulkhead gasket, side rail gasket, and tailgate gasket are disclosed herein. However, some tonneau covers may not use all of these types of gaskets. In some embodiments, the different gaskets can be used in different areas of the truck bed depending on the dimensions of the particular design and thus the disclosure is not so limited to the particular location. For example, a bulkhead gasket may be used as a side rail gasket or a tailgate gasket depending on the configuration of the vehicle. Thus, the particular location of the gaskets are not limited by their respective names. In some embodiments, a plurality of each of the gaskets can be used for improved sealing.

Side Rail Gasket

Disclosed herein are embodiments of a gasket that can be used on the side rails of the tonneau cover (e.g., the rails extending from the cab to the tailgate of a vehicle) between a rail of the tonneau cover and the side of a vehicle. However, the particular location does not limit the disclosure.

Figure 2:
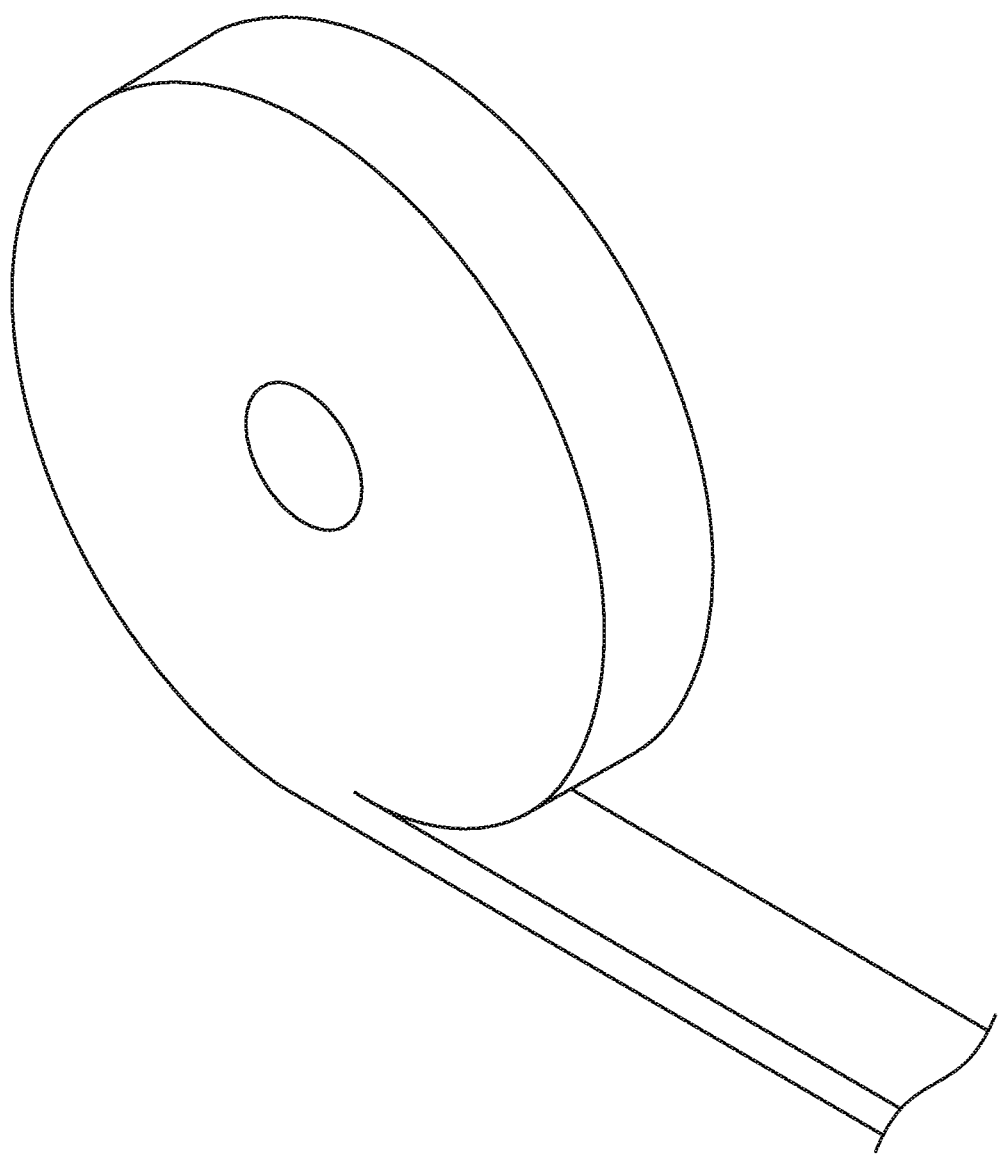
FIG. 2 illustrates a side rail gasket of the prior art.

FIG. 2 illustrates the current gasket used in the prior art. As shown, a strip of foam is typically used to extend along the side rail. The side rail of the tonneau cover can compress the foam against the truck bed frame. However, this can be difficult to waterproof due to the dimensional variations of the truck bed and may not provide adequate sealing as discussed above.

Figure 3:
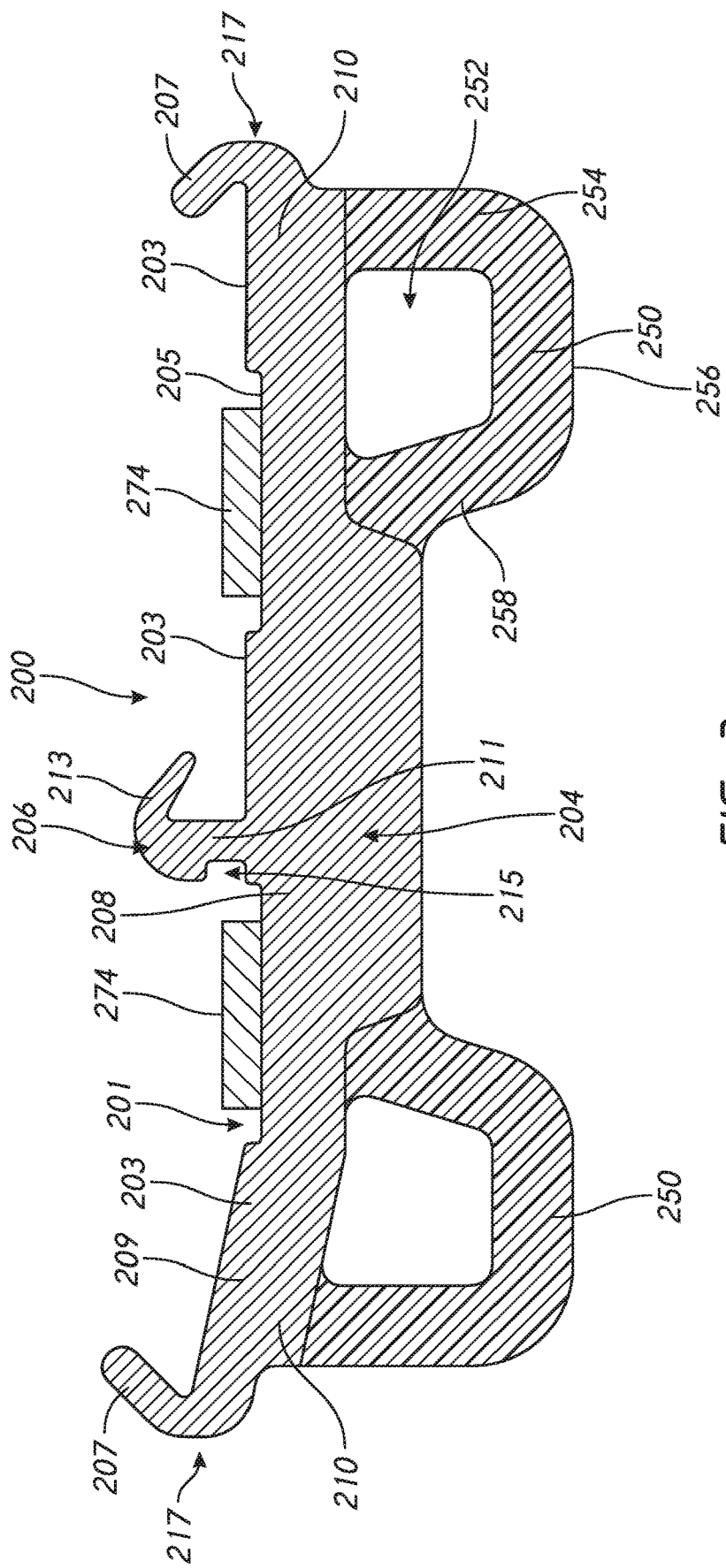
FIG. 3 illustrates an embodiment of a modified side rail gasket for a tonneau cover.
Figure 4A:
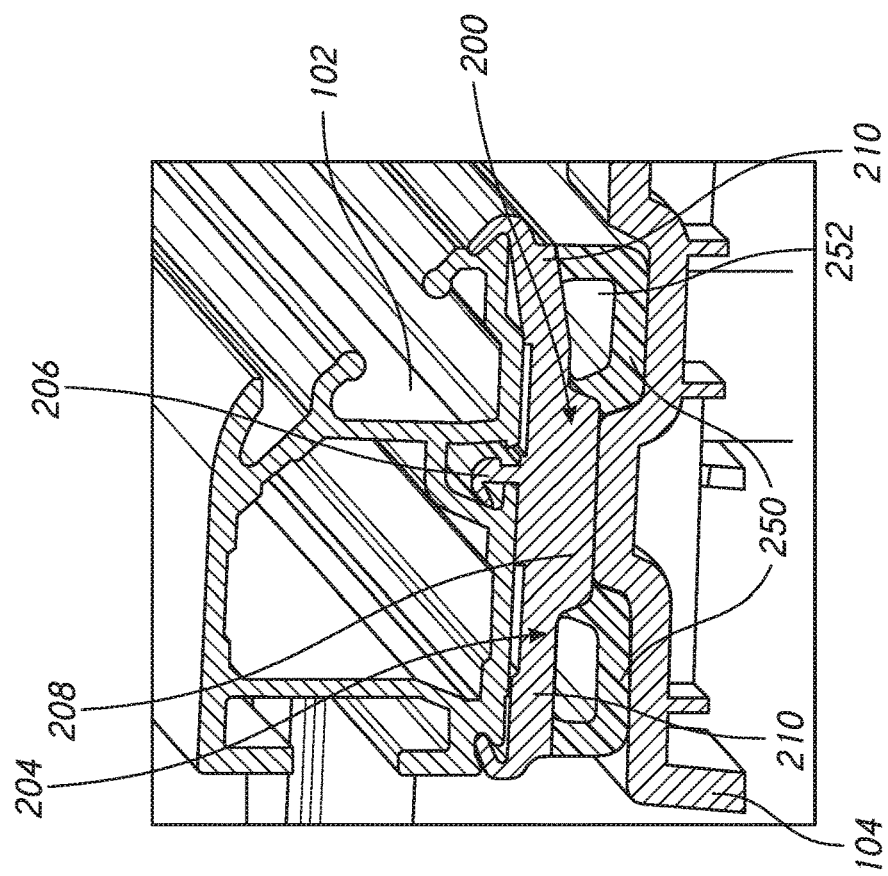
FIGS. 4A-4B illustrate embodiments of a modified side rail gasket for a tonneau cover with a tonneau cover and vehicle.
Figure 4B:
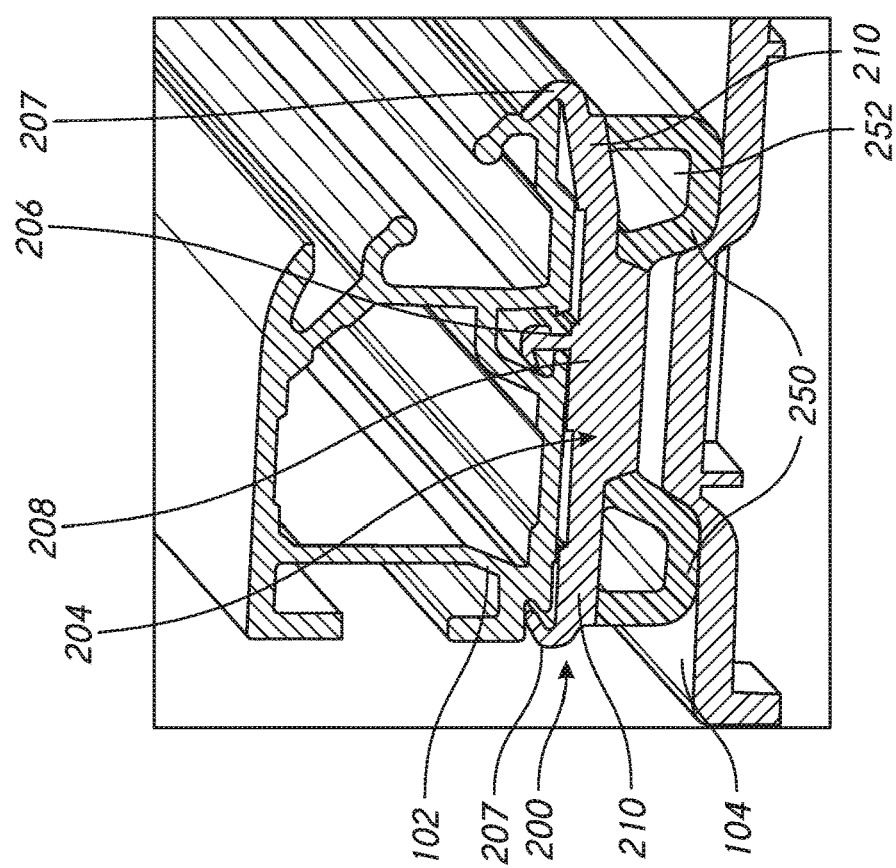

FIG. 3 illustrates an embodiment of a modified side rail gasket 200 that can provide improved sealing and can be adapted for any number of different vehicles. The gasket 200 can be generally formed of two structural components. There is the crushable seals, such as bulbs 250 (e.g., compression component) and the substrate, such as attachment component 204, such as a strip, located generally on top of the crushable bulbs 250. FIGS. 4A-4B illustrate the modified side rail gasket 200 between the frame 102 and the truck bed rail 104. FIG. 4A illustrates the gasket 200 in the uncompressed configuration and FIG. 4B illustrates the gasket 200 compressed.

The attachment component 204 can extend the width of the frame 102 (or generally the width of the frame 102). In some embodiments, the attachment component 204 can be slightly wider than the frame 102 in order to properly attach to the frame 102. In some embodiments, the attachment component 204 can generally contour against the bottom of the frame 102, in particular when the gasket 200 is upon compression. For example, the top surface 201 of the attachment component 204 can include raised portions 203 and lowered portions 205. However, in some embodiments the top surface 201 of the attachment component 204 can be generally flat and not include raised or lowered portions. In some embodiments, the attachment component 204 can contain alternating raised and lowered portions.

In some embodiments, the raised portions can be upwardly or lowered angled portions 209 from a horizontal surface. In some embodiments, one raised portion 203 can be horizontal (or generally horizontal) and one raised portion can be an angled portion 209. In some embodiments, the angled portions 209 can be angled 5, 10, 15, or 20° from horizontal. In some embodiments, the angled portions 209 can be angled greater than 5, 10, 15, or 20° from horizontal. In some embodiments, the angled portions 209 can be angled less than 5, 10, 15, or 20° from horizontal. The angles can help attach the gasket 200 to the frame 102 as shown in FIGS. 4A-4B. In some embodiments, all raised portions 209 can be generally horizontal. In some embodiments, all raised portions 209 can be upwardly angled.

The attachment component 204 can include a number of interference connectors, such as protrusions 206 and outer hooks 207 extending upwards to connect to the bottom/side surface of the frame 102. As shown, three different protrusions/hooks 206/207 can be used (the protrusion 206 the middle and one on each side of the side rail 102), though this does not limit this disclosure. For example, the attachment component 204 can include 1, 2, 3, 4, or 5 interface connectors. The protrusions 206 and outer hooks 207 can extend along a length of the gasket 200 or can be a number of discrete points.

The protrusion 206 can extend upwards from a top surface 201 of the attachment portion 204 and can include a tab 211 extending upwards, a hooked portion 213 on the end of the tab 211, and a gap 215 (e.g., cutout, space) on one side of the tab 211. As shown in FIGS. 4A-4B, the hooked portion 213 can wrap around a portion of the frame 102, and the gap 215 can receive a portion of the frame 102 to hold the frame 102 to the gasket 200. In some embodiments, the protrusion 206 can extend from a raised portion 203 or a lowered portion 205. In some embodiments, the protrusion 206 is located generally at the center of a portion. In some embodiments, the protrusion 206 can be offset such as shown in FIG. 3. In some embodiments, the hooked portion 213 can extend towards one of the outer edges 217 of the width of the attachment component 204. In some embodiments, the hooked portion 213 can extend towards both edges 217 of the width of the attachment component 204, e.g., having two hooks.

Further, the attachment component 204 can include raised outer interference connectors or grippers such as hooks 207 extending upwards and inwards from a top surface 201 and at the outer edges 217 of the attachment component 204. In some embodiments, a single outer hook 207 can be used. In some embodiments, the outer hooks 207 can have the same angle with respect to the top surface 201. In some embodiments, the outer hooks 207 can have differing angles. As shown in FIG. 3, one of the outer hooks 207 can extend from the angled portion 209. The outer hooks 207 can have an angle of about 30, 35, 40, 45, 50, or 50 degrees from the top surface 201. The outer hooks 207 can have an angle of greater than about 30, 35, 40, 45, 50, or 50 degrees from the top surface 201. The outer hooks 207 can have an angle of less than about 30, 35, 40, 45, 50, or 50 degrees from the top surface 201.

The protrusion 206 and outer hooks 207 can be configured to be releasably retained around/within the frame 102. In some embodiments, the gasket 200 can be held to the frame 102 by friction. In some embodiments, adhesives, such as tape, glue, epoxy, etc. can be used to attach the gasket 200 to the frame 102. In some embodiments, the interface connectors can extend the entire length of the gasket 200. In some embodiments, a number of each of the interface connectors can be used spaced along the length of the gasket 200.

The attachment component 204 can include a thicker center stop 208 connecting two thinner arms 210. The center stop 208 can be 1.1, 1.2, 1.3, 1.4, 1.5, 1.6, 1.7, 1.8, 1.9, or 2 times the thickness from top to bottom as the arms 210. The center stop 208 can be greater than 1.1, 1.2, 1.3, 1.4, 1.5, 1.6, 1.7, 1.8, 1.9, or 2 times the thickness from top to bottom as the arms 210. The center stop 208 can be less than 1.1, 1.2, 1.3, 1.4, 1.5, 1.6, 1.7, 1.8, 1.9, or 2 times the thickness from top to bottom as the arms 210. In some embodiments, the arms 210 are the same dimensions. In some embodiments, the arms 210 have different dimensions.

The arms 210 can extend generally away from the stop 208 toward the distal or width ends of the frame 102 to wrap around the frame 102 with the outer hooks 207 as shown in FIGS. 4A-4B. The arms 210 can abut against a bottom surface of the frame 102. The stop 208 can be configured to rest against the truck bed rail 104 on its bottom surface and the frame 102 on its top surface. In some embodiments, the stop 208 may not rest on the truck bed rail 104. In some embodiments, the stop 208 only rests on the truck bed rail 104 when the gasket 200 is compressed. In some embodiments, the stop 208 can be formed from a dense rubber to act as a "hard stop" to limit the amount of crush on the crushable bulbs 250, discussed below.

Attached to the attachment component 204 are two crushable bulbs 250. In some embodiments, only one bulb is used. In some embodiments, 3, 4, 5, or 6 crushable bulbs can be used. The bulbs 250 can be located generally under each of the arms 210 and can connect to the arms 210 and stop 208. The bulbs 250 may form an empty pathway 252 (e.g., hole, through hole, passage, empty space) that can extend the length of the gasket 200, or partially along the length of the gasket 200. Thus, when pressure is applied onto the gasket 200, the bulbs 250 can flatten out and the pathways 252 can change dimensions, such as shown in FIGS. 4A-4B. This can generally work as a foam crush and can fill in spaces between the frame 102 and the vehicle frame 104 to improve sealability. As mentioned above, the dense stop 208 can prevent the bulbs 250 from being crushed too much.

Each of the bulbs 250 can have an outer wall 254 extending downwards from the under surface of arm 210 near or at edge 217. The outer wall 254 can turn inward towards the stop 208 to from a bottom wall 256. The bottom wall 256 can turn upwards or upwards at an inward angle to form the inner wall 258. The inner wall 258 can connect back to the under surface of the arm 210 and/or to stop 208. Thus, the outer wall 254, bottom wall 256, inner wall 258, and arm 210 can form a generally rectangular, square, circular, or oval cross section.

In some embodiments, the bulbs 250 and the center attachment component 204 can be formed from the same material. In some embodiments, they can be formed from different materials. In some embodiments, the bulbs 250 can be formed from a more bendable/flexible/crushable material (or less dense material) whereas the center attachment component 204 can be formed of a denser/harder material. For example, the bulb 250 can be formed of ethylene propylene diene monomer (EPDM) sponge. Further, the rest of the gasket 200 can be formed of dense EPDM. In some embodiments, the material for the components are rubbers, polymers, etc. and the particular material does not limit the disclosure.

In some embodiment the bulbs 250 can be integrally formed with the center attachment component 204. In some embodiments, the bulbs 250 can be attached to the center attachment component 204, such as through adhesive, mechanical fastening, etc. and the particular attachment means does not limit the disclosure.

FIGS. 4A-4B illustrate the modified side rail gasket 200 located on a vehicle in an uncompressed FIG. 4A and compressed FIG. 4B configuration. As shown, the gasket 200 can fit between a side of a frame of a tonneau cover 102 and the vehicle rails 104. Thus, two gaskets 200 can be used, one on each side of the tonneau cover. In some embodiments, only one gasket 200 may be used. The gasket 200 can extend the length of the tonneau cover frame 102, or a majority of the length of the tonneau cover frame 102. In some embodiments, the gasket 200 can extend approximately 80%, 90%, 95%, 98%, 99%, or 100% of the frame 102 length. In some embodiments, the gasket 200 can extend greater than approximately 60%, 70, 80%, 90%, 95%, 98%, or 99% of the frame 102 length. In some embodiments, the gasket 200 can extend less than approximately 70%, 80%, 90%, 95%, 98%, 99%, or 100% of the frame 102 length. In some embodiments, a plurality of gaskets 200 can be used under each side rail, for example spaced apart.

As shown in FIG. 3, the gasket 200 can also include adhesive 274, such as tape, on its top side to help connect to a side rail. In some embodiments, an adhesive may not be used. In some embodiments, the adhesive 274 may allow the gasket 200 to be removed from the side rail. In some embodiments, the adhesive 274 permanently attaches the gasket 200 to the side rail. In some embodiments, there can be adhesive 274 on a bottom side to help connect to the frame of the vehicle.

In some embodiments, one strip of adhesive 274 can be used on the top of the gasket 200. In some embodiments, two strips of adhesive 274 can be used, such as shown in FIG. 3. The adhesive 274 can be located on opposite sides of the outside protrusion 206 spaced apart on the width of the gasket 200.

In some embodiments, the adhesive 274 can extend approximately 80%, 90%, 95%, 98%, 99%, or 100% of the gasket 200 length. In some embodiments, the adhesive 274 can extend greater than approximately 60%, 70, 80%, 90%, 95%, 98%, or 99% of the gasket 200 length. In some embodiments, the adhesive 274 can extend less than approximately 70%, 80%, 90%, 95%, 98%, 99%, or 100% of the gasket 200 length.

Bulkhead Gasket

Disclosed herein are embodiments of a gasket that can be used on the bulkhead of the tonneau cover (e.g., portion of the tonneau cover abutting and/or facing the vehicle cab). However, the particular location does not limit the disclosure.

Figure 5:
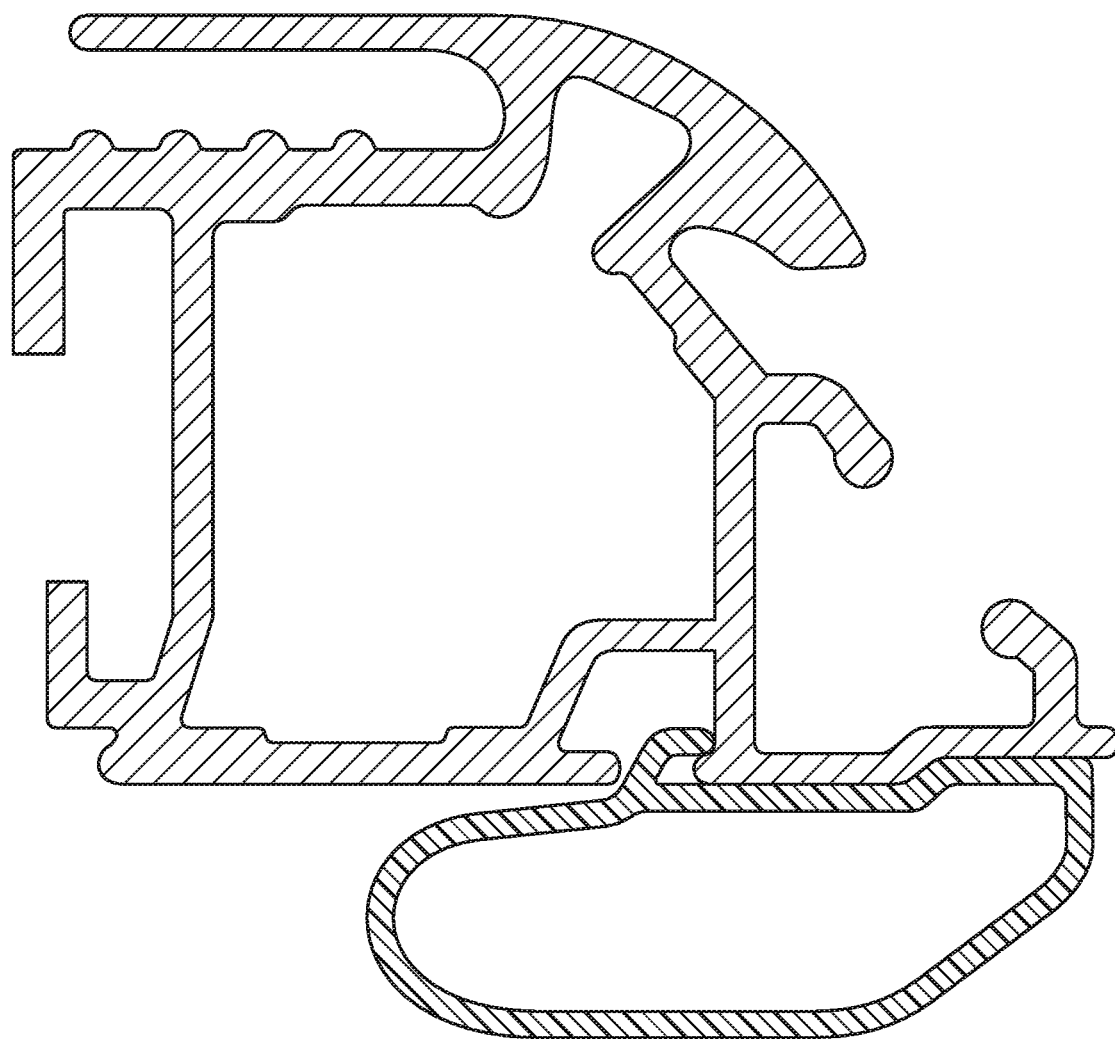
FIG. 5 illustrates a bulkhead gasket of the prior art.

FIG. 5 illustrates the current design currently on the marketplace. As shown, the gasket extends along the side of the bulkhead as well as partially on top of the bulkhead. Compression of the gasket merely compresses the top surface to form a seal, which may not be fully water tight.

Figure 6:
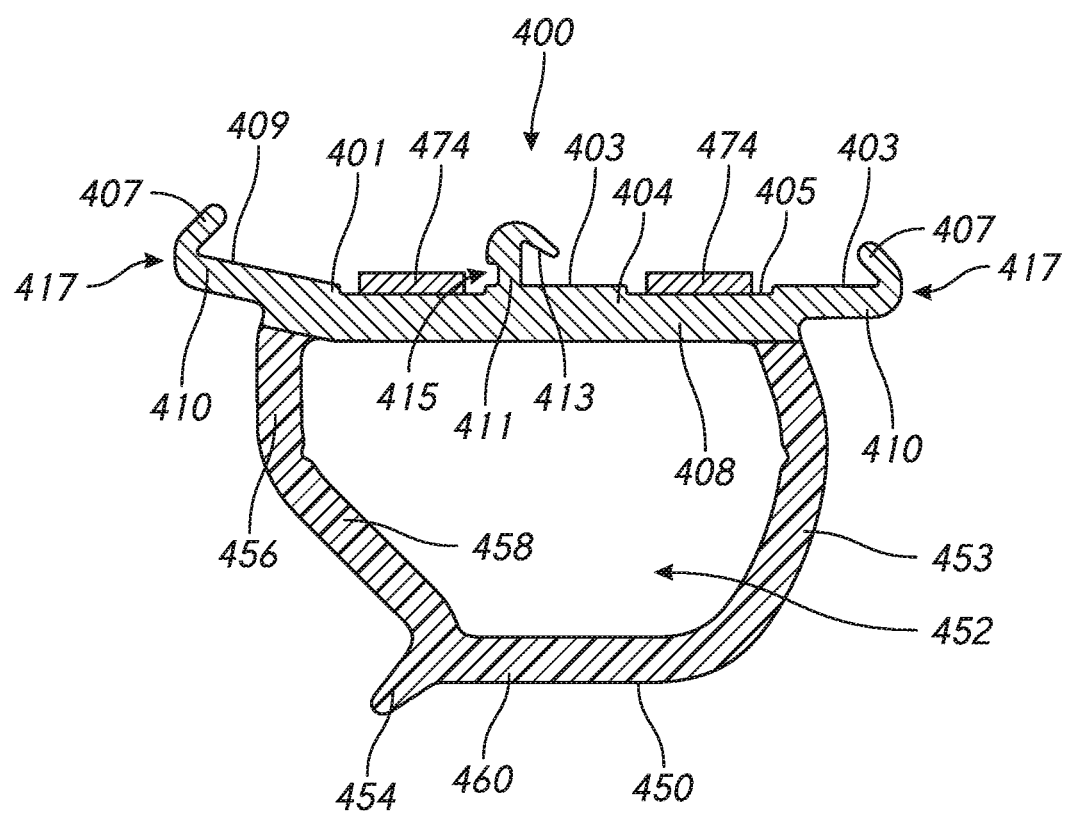
FIG. 6 illustrates an embodiment of a modified bulkhead gasket for a tonneau cover.
Figure 7B:
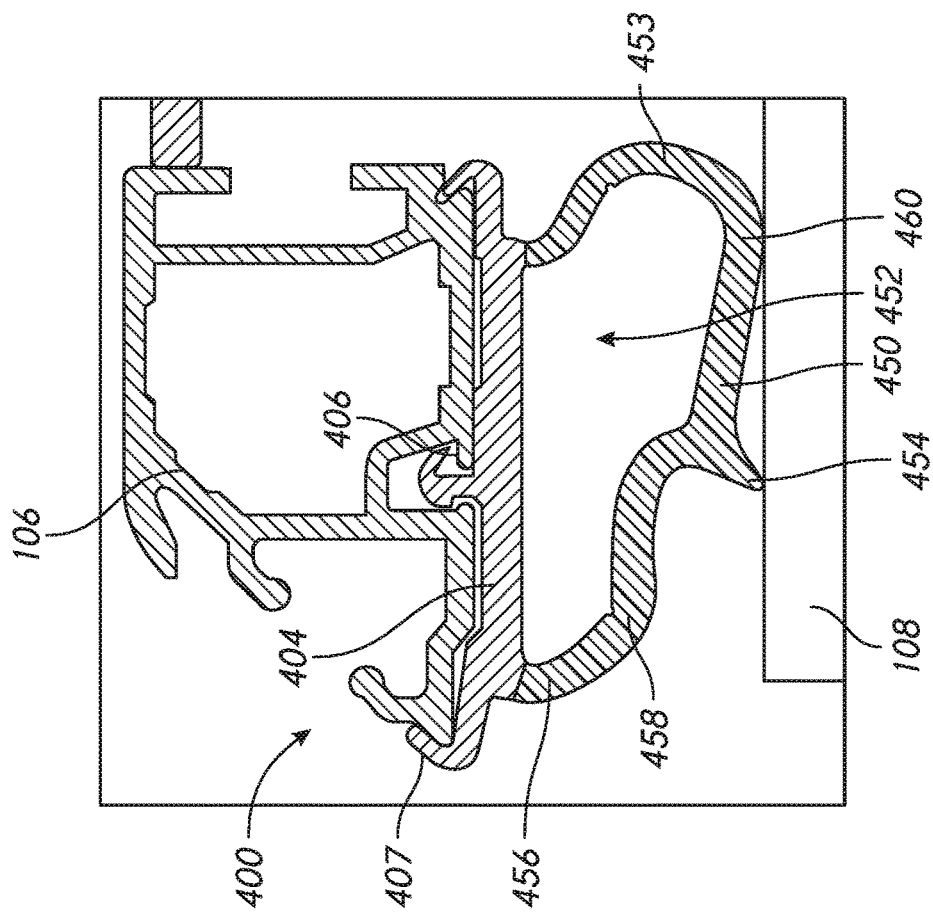
FIGS. 7A-7B illustrate an embodiment of a modified bulkhead gasket for a tonneau cover with a tonneau cover and vehicle.
Figure 7A:
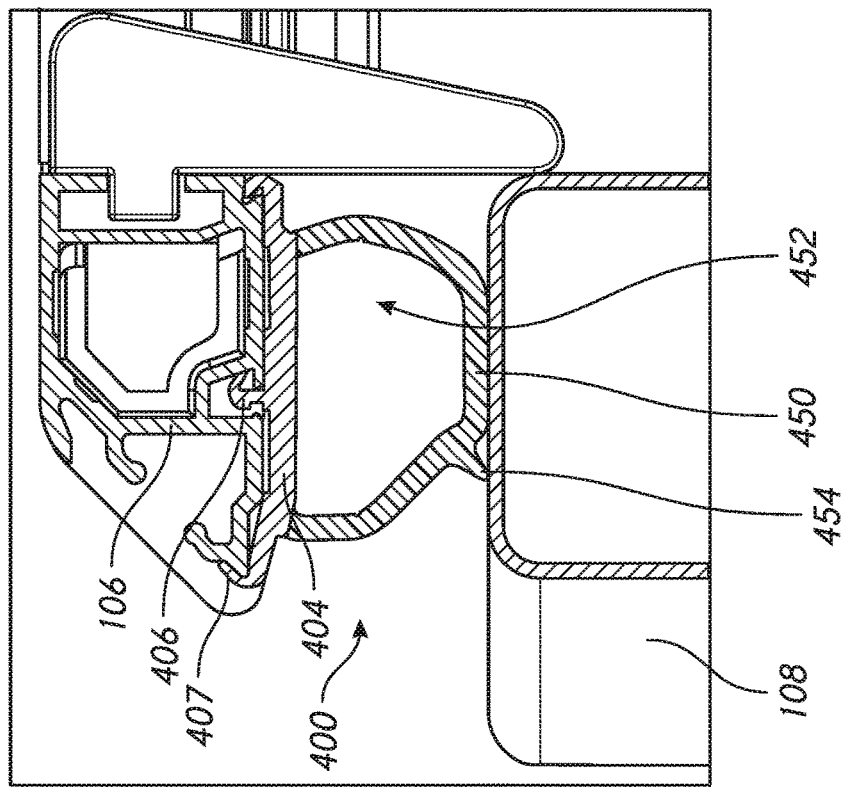

FIG. 6 illustrates an embodiment of a modified bulkhead gasket 400 that can provide improved sealing and can be adapted for any number of different vehicles. The gasket 400 can be generally formed of two structural components. There is a crushable seal, such as bulbs 450 (e.g., compression component) and the substrate, such as attachment component 404, such as a strip, located generally on top of the crushable bulb 450. FIGS. 7A-7B illustrate the gasket 400 between the frame 106 and the truck bed bulkhead 108. FIG. 7A illustrates the gasket 400 in the uncompressed configuration and FIG. 7B illustrates the gasket 400 compressed.

The attachment component 404 can extend the width of the frame 106 (or generally the width of the frame 106). In some embodiments, the attachment component 404 can be slightly wider than the frame 106 in order to properly attach to the frame 106. In some embodiments, the attachment component 404 can generally contour against the bottom of the frame 106, in particular when the gasket 400 is upon compression. For example, the top surface 401 of the attachment component 404 can include raised portions 403 and lowered portions 405. However, in some embodiments the top surface 401 of the attachment component 404 can be generally flat and not include raised or lowered portions. In some embodiments, the attachment component 404 can contain alternating raised and lowered portions.

In some embodiments, the raised portions can be upwardly or lowered angled portions 409 from a horizontal surface. In some embodiments, one raised portion 403 can be horizontal (or generally horizontal) and one raised portion can be an angled portion 409. In some embodiments, the angled portions 409 can be angled 5, 10, 15, or 20° from horizontal. In some embodiments, the angled portions 409 can be angled greater than 5, 10, 15, or 20° from horizontal. In some embodiments, the angled portions 409 can be angled less than 5, 10, 15, or 20° from horizontal. The angles can help attach the gasket 400 to the frame 106. In some embodiments, all raised portions 409 can be generally horizontal. In some embodiments, all raised portions 409 can be upwardly angled.

The attachment component 404 can include a number of interference connectors, such as protrusions 406 and outer hooks 407 extending upwards to connect to the bottom/side surface of the frame 106. As shown, three different protrusions/hooks 406/407 can be used (the protrusion 406 the middle and one on each side of the rail 106), though this does not limit this disclosure. The protrusions 406 and outer hooks 407 can extend along a length of the gasket 400 or can be a number of discrete points.

The protrusion 406 can extend upwards from a top surface 401 of the attachment portion 404 and can include a tab 411 extending upwards, a hooked portion 413 on the end of the tab 411, and a gap 415 (e.g., cutout, space) on one side of the tab 411. As shown in FIGS. 7A-7B, the hooked portion 413 can wrap around a portion of the frame 106, and the gap 415 can receive a portion of the frame 106 to hold the frame 106 to the gasket 400. In some embodiments, the protrusion 406 can extend from a raised portion 403 or a lowered portion 405. In some embodiments, the protrusion 406 is located generally at the center of a portion. In some embodiments, the protrusion 406 can be offset such as shown in FIG. 6. In some embodiments, the hooked portion 413 can extend towards one of the outer edges 417 of the width of the attachment component 404. In some embodiments, the hooked portion 413 can extend towards both edges 417 of the width of the attachment component 404, e.g., having two hooks.

Further, the attachment component 404 can include outer hooks 407 extending upwards and inwards from a top surface 401 and at the outer edges 417 of the attachment component 404. In some embodiments, a single outer hook 407 can be used. In some embodiments, the outer hooks 407 can have the same angle with respect to the top surface 401. In some embodiments, the outer hooks 407 can have differing angles. As shown in FIG. 6, one of the outer hooks 407 can extend from the angled portion 409. The outer hooks 407 can have an angle of about 30, 35, 40, 45, 50, or 50 degrees from the top surface 401. The outer hooks 407 can have an angle of greater than about 30, 35, 40, 45, 50, or 50 degrees from the top surface 401. The outer hooks 407 can have an angle of less than about 30, 35, 40, 45, 50, or 50 degrees from the top surface 401.

The protrusion 406 and outer hooks 407 can be configured to be releasably retained around/within the frame 106. In some embodiments, the gasket 400 can be held to the frame 106 by friction. In some embodiments, adhesives, such as tape, glue, epoxy, etc. can be used to attach the gasket 400 to the frame 106. In some embodiments, the interface connectors can extend the entire length of the gasket 400. In some embodiments, a number of each of the interface connectors can be used spaced along the length of the gasket 400.

The attachment component 404 can include a thicker center stop 408 connecting two thinner arms 410. The center stop 408 can be 1.1, 1.2, 1.3, 1.4, 1.5, 1.6, 1.7, 1.8, 1.9, or 2 times the thickness from top to bottom as the arms 410. The center stop 408 can be greater than 1.1, 1.2, 1.3, 1.4, 1.5, 1.6, 1.7, 1.8, 1.9, or 2 times the thickness from top to bottom as the arms 410. The center stop 408 can be less than 1.1, 1.2, 1.3, 1.4, 1.5, 1.6, 1.7, 1.8, 1.9, or 2 times the thickness from top to bottom as the arms 410. In some embodiments, the arms 410 are the same dimensions. In some embodiments, the arms 410 have different dimensions.

The arms 410 can extend generally away from the stop 408 toward the distal or width ends of the frame 106 to wrap around the frame 106 with the outer hooks 407 as shown in FIGS. 7A-7B. The arms 410 can abut against a bottom surface of the frame 106. The stop 408 can be configured to rest against the truck bed bulkhead 108 on its bottom surface and the frame 106 on its top surface. In some embodiments, the stop 408 may not rest on the truck bulkhead 108. In some embodiments, the stop 408 only rests on the truck bed bulkhead 108 when the gasket 400 is compressed. In some embodiments, the stop 408 can be formed from a dense rubber to act as a "hard stop" to limit the amount of crush on the crushable bulbs 450, discussed below.

Attached to the attachment component 404 is a crushable bulb 450. In some embodiments, 3, 4, 5, or 6 crushable bulbs can be used. The bulb 450 can be located generally under each of the stop 408 and can connect to the arms 410 and/or stop 408. The bulb 450 may form an empty pathway 452 (e.g., hole, through hole, passage, empty space) that can extend the length of the gasket 400, or partially along the length of the gasket 400. Thus, when pressure is applied onto the gasket 400, the bulb 450 can flatten out and the pathways 452 can change dimensions, such as shown in FIGS. 7A-7B. This can generally work as a foam crush and can fill in spaces between the frame 106 and the vehicle bulkhead 108 to improve sealability. As mentioned above, the dense stop 408 can prevent the bulbs 450 from being crushed too much.

The bulb 450 can have a curved wall 453 (though in some embodiments the wall may be straight) extending downwards from one side of the stop 408. On the opposite side of the stop 408, the bulb 450 can have a downward extending wall 456 and an inward extending wall 458 attached at a bottom of the downward extending wall 456. The internal angle between the downward extending wall 456 and the inward extending wall 458 can be 100, 110, 120, 130, 140, 150, 160, 170, or 180°. In some embodiments, the internal angle between the downward extending wall 456 and the inward extending wall 458 can be greater than 100, 110, 120, 130, 140, 150, 160, or 170°. In some embodiments, the internal angle between the downward extending wall 456 and the inward extending wall 458 can be less than 100, 110, 120, 130, 140, 150, 160, 170, or 180°. The bottom of the inward extending wall 458 and the curved wall 453 can be connected by a bottom wall 460. In some embodiments, the curved wall 453 is generally under the angled section 409. In some embodiments, the downward extending wall 456 is generally under the angled section 409. In some embodiments, the bulb 450 attaches directly to a bottom of the stop 408. In some embodiments, the bulb 450 attaches directly to a bottom of the arms 410. The bulb 450 can form a generally rectangular, square, circular, or oval cross section.

At the connection between the inward extending wall 458 and the bottom wall 460 can extend a foot protrusion 454. The foot protrusion 454 can extend laterally towards the downward extending wall 453. In some embodiments, the foot protrusion 454 can be approximately 0.1, 0.3, 0.5, 0.7, 1, 1.5, 2, 2.5, or 3 inches in length. In some embodiments, the foot protrusion 454 can be greater than approximately 0.1, 0.3, 0.5, 0.7, 1, 1.5, 2, 2.5, or 3 inches in length. In some embodiments, the foot protrusion 454 can be less than approximately 0.1, 0.3, 0.5, 0.7, 1, 1.5, 2, 2.5, or 3 inches in length. In some embodiments, the gasket 400 may not have a foot protrusion 454.

In the uncompressed position, the foot protrusion 454 can extend generally downwards and away from the gasket 400. In some embodiments, the angle between the foot protrusion 454 and the bottom wall can be 30, 40, 45, 50, or 60°. In some embodiments, the angle between the foot protrusion 454 and the bottom wall can be greater than 30, 40, 45, 50, or 60°. In some embodiments, the angle between the foot protrusion 454 and the bottom wall can be less than 30, 40, 45, 50, or 60°.

When compressed, as shown in FIG. 7B, the angle of the foot protrusion can change which can increase the water tightness. In some embodiments, the angle between the foot protrusion 454 and the bottom surface can increase under compression. In some embodiments, the angle between the foot protrusion 454 and the bottom surface can decrease under compression. In some embodiments, the gasket 400 can be compressed to a generally flat position. Thus, the bottom of the attachment section 404 can abut against the top of the bulb 450.

The bulb 450 can form a bulb seal with a pathway 452 along its length, allowing the gasket 400 to be compressed. Thus, when the tonneau cover is placed over the gasket, it compresses the bulb section 450 (see FIG. 7B) to help form a watertight seal.

In some embodiments, the bulb 450 and the center attachment component 404 can be formed from the same material. In some embodiments, they can be formed from different materials. In some embodiments, the bulb 450 can be formed from a more bendable/flexible/crushable material (or less dense material) whereas the center attachment component 404 can be formed of a denser/harder material. For example, the bulb 450 can be formed of ethylene propylene diene monomer (EPDM) sponge. Further, the rest of the gasket 400 can be formed of dense EPDM. In some embodiments, the material for the components are rubbers, polymers, etc. and the particular material does not limit the disclosure.

In some embodiment the bulb 450 can be integrally formed with the center attachment component 404. In some embodiments, the bulbs 450 can be attached to the center attachment component 404, such as through adhesive, mechanical fastening, etc. and the particular attachment means does not limit the disclosure.

FIGS. 7A-7B illustrate the modified bulkhead gasket 400 located on a vehicle in an uncompressed FIG. 7A and compressed FIG. 7B configuration. As shown, the gasket 400 can fit between a side of a frame of a tonneau cover 106 and the vehicle bulkhead 108. Thus, a single gasket 400 can be used as there typically is only one bulkhead 108. In some embodiments, more than one gasket 400 can be used. The gasket 400 can extend the length of the tonneau cover frame 106, or a majority of the length of the tonneau cover frame 106. In some embodiments, the gasket 400 can extend approximately 80%, 90%, 95%, 98%, 99%, or 100% of the frame 106 length. In some embodiments, the gasket 400 can extend greater than approximately 60%, 70, 80%, 90%, 95%, 98%, or 99% of the frame 106 length. In some embodiments, the gasket 400 can extend less than approximately 70%, 80%, 90%, 95%, 98%, 99%, or 100% of the frame 106 length. In some embodiments, a plurality of gaskets 400 can be used under each side rail, for example spaced apart.

As shown in FIG. 6, the gasket 400 can also include adhesive 474, such as tape, on its top side to help connect to a side rail. In some embodiments, an adhesive may not be used. In some embodiments, the adhesive 474 may allow the gasket 400 to be removed from the side rail. In some embodiments, the adhesive 474 permanently attaches the gasket 400 to the side rail. In some embodiments, there can be adhesive 474 on a bottom side to help connect to the frame of the vehicle.

In some embodiments, one strip of adhesive 474 can be used on the top of the gasket 400. In some embodiments, two strips of adhesive 474 can be used, such as shown in FIG. 6. The adhesive 474 can be located on opposite sides of the outside protrusion 406 spaced apart on the width of the gasket 400.

In some embodiments, the adhesive 474 can extend approximately 80%, 90%, 95%, 98%, 99%, or 100% of the gasket 400 length. In some embodiments, the adhesive 474 can extend greater than approximately 60%, 70, 80%, 90%, 95%, 98%, or 99% of the gasket 400 length. In some embodiments, the adhesive 474 can extend less than approximately 70%, 80%, 90%, 95%, 98%, 99%, or 100% of the gasket 400 length.

Tailgate Gasket

Disclosed herein are embodiments of a gasket that can be used on the tailgate of the tonneau cover. However, the particular location does not limit the disclosure.

Figure 8:
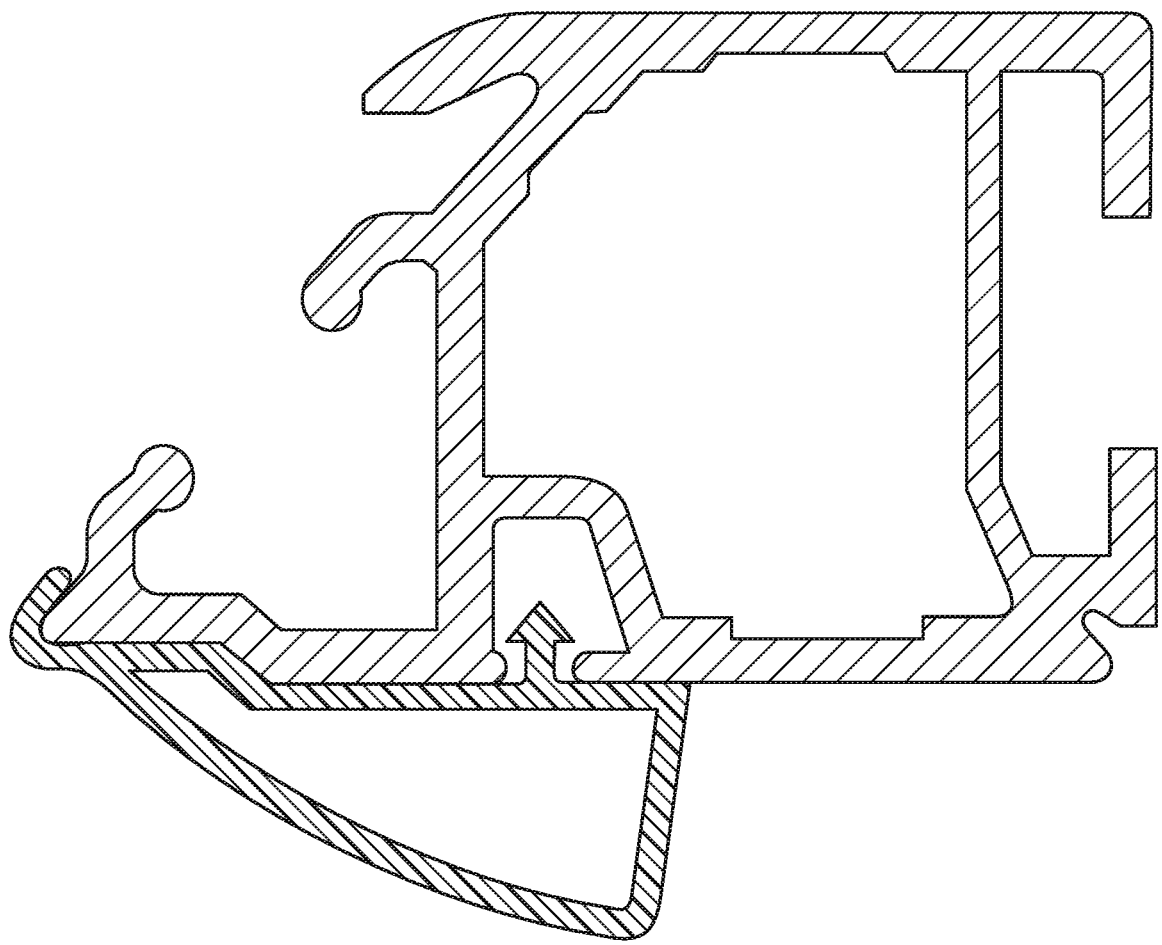
FIG. 8 illustrates a tailgate gasket of the prior art.

FIG. 8 illustrates the current design currently on the marketplace. As shown, the gasket extends along the side of the tailgate as well as partially on top of the tailgate. Compression of the gasket merely compresses the top surface to form a seal, which may not be fully watertight. This causes significant leakage into the vehicle bed, which can be a major problem in the industry.

Figure 9:
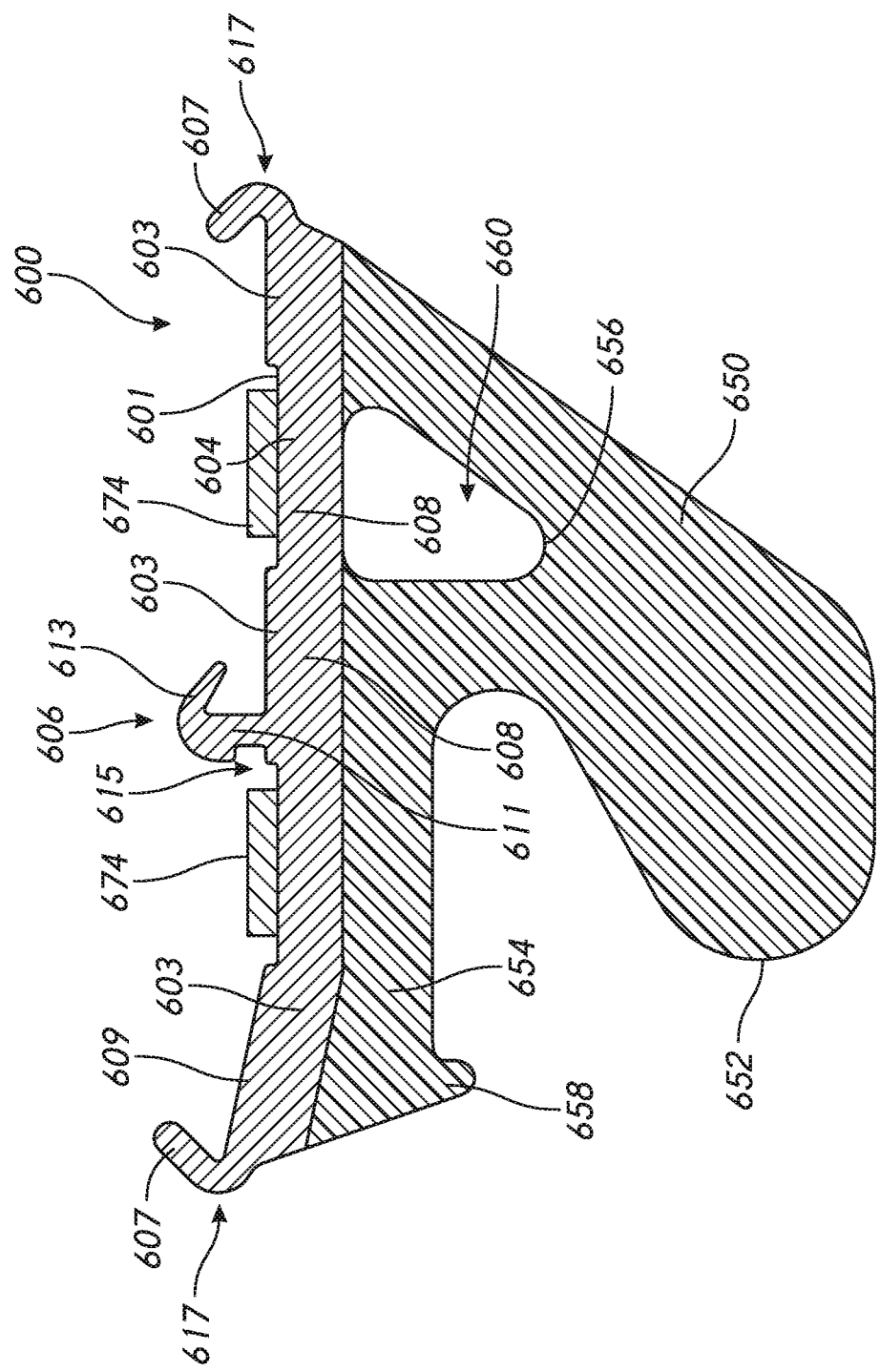
FIG. 9 illustrates an embodiment of a modified tailgate gasket for a tonneau cover.
Figure 10A:
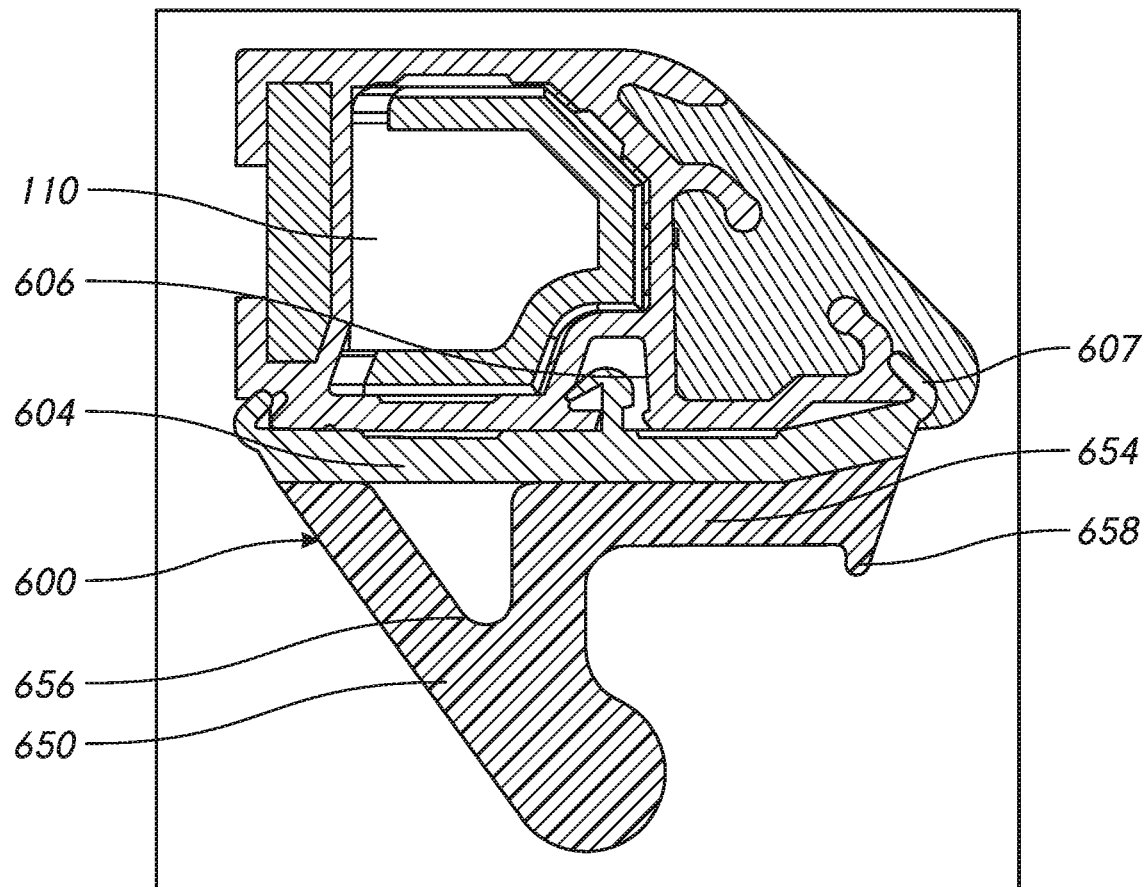
FIGS. 10A-10B illustrate an embodiment of a modified tailgate gasket for a tonneau cover with a tonneau cover and vehicle.
Figure 10B:
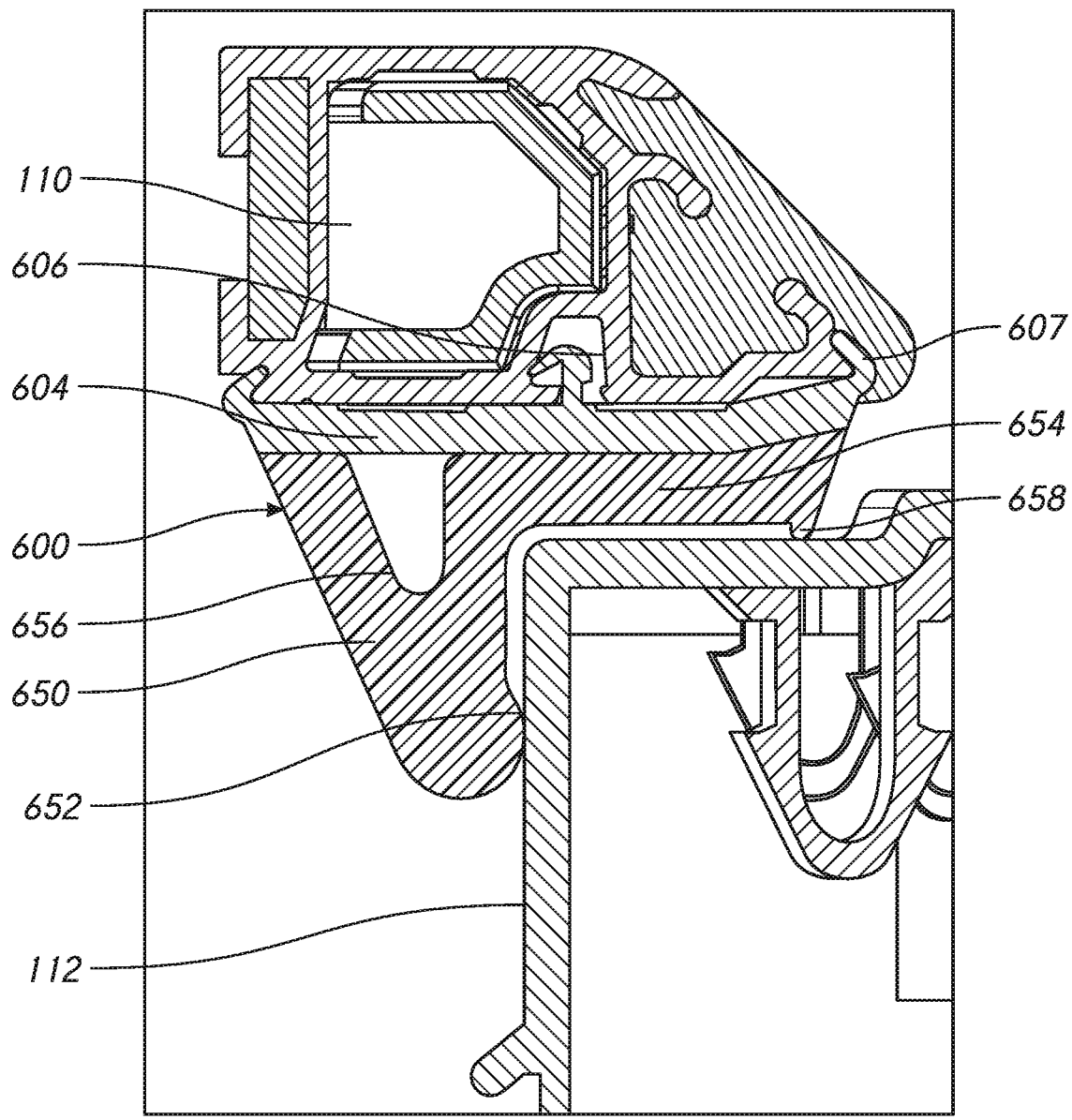

FIG. 9 illustrates an embodiment of a modified side rail gasket 600 that can provide improved sealing and can be adapted for any number of different vehicles. The gasket 600 can be generally formed of two structural components. There is the compression section 650 and an attachment component 604, such as a strip, located generally on top of the compression section 650. FIGS. 10A-10B illustrate the modified tailgate gasket 600 between the frame 110 and the tailgate 112. FIG. 10A illustrates the gasket 600 in the uncompressed configuration and FIG. 10B illustrates the gasket 600 compressed.

The attachment component 604 can extend the width of the frame 110 (or generally the width of the frame 110). In some embodiments, the attachment component 604 can be slightly wider than the frame 110 in order to properly attach to the frame 110. In some embodiments, the attachment component 604 can generally contour against the bottom of the frame 110, in particular when the gasket 600 is upon compression. For example, the top surface 601 of the attachment component 604 can include raised portions 603 and lowered portions. However, in some embodiments the top surface 601 of the attachment component 604 can be generally flat and not include raised or lowered portions. In some embodiments, the attachment component 604 can contain alternating raised and lowered portions.

In some embodiments, the raised portions can be upwardly or lowered angled portions 609 from a horizontal surface. In some embodiments, one raised portion 603 can be horizontal (or generally horizontal) and one raised portion can be an angled portion 609. In some embodiments, the angled portions 609 can be angled 5, 10, 15, or 20° from horizontal. In some embodiments, the angled portions 609 can be angled greater than 5, 10, 15, or 20° from horizontal. In some embodiments, the angled portions 609 can be angled less than 5, 10, 15, or 20° from horizontal. The angles can help attach the gasket 600 to the frame 110. In some embodiments, all raised portions 609 can be generally horizontal. In some embodiments, all raised portions 609 can be upwardly angled.

The attachment component 604 can include a number of interference connectors, such as protrusions 606 and outer hooks 607 extending upwards to connect to the bottom/side surface of the frame 110. As shown, three different protrusions/hooks 606/607 can be used (the protrusion 606 the middle and one on each side of the side rail 110), though this does not limit this disclosure. The protrusions 606 and outer hooks 607 can extend along a length of the gasket 600 or can be a number of discrete points.

The protrusion 606 can extend upwards from a top surface 601 of the attachment portion 604 and can include a tab 611 extending upwards, a hooked portion 613 on the end of the tab 611, and a gap 615 (e.g., cutout, space) on one side of the tab 611. As shown in FIGS. 10A-10B, the hooked portion 613 can wrap around a portion of the frame 110, and the gap 615 can receive a portion of the frame 110 to hold the frame 110 to the gasket 600. In some embodiments, the protrusion 606 can extend from a raised portion 603 or a lowered portion. In some embodiments, the protrusion 606 is located generally at the center of a portion. In some embodiments, the protrusion 606 can be offset such as shown in FIG. 9. In some embodiments, the hooked portion 613 can extend towards one of the outer edges 617 of the width of the attachment component 604. In some embodiments, the hooked portion 613 can extend towards both edges 617 of the width of the attachment component 604, e.g., having two hooks.

Further, the attachment component 604 can include outer hooks 607 extending upwards and inwards from a top surface 601 and at the outer edges 617 of the attachment component 604. In some embodiments, a single outer hook 607 can be used. In some embodiments, the outer hooks 607 can have the same angle with respect to the top surface 601. In some embodiments, the outer hooks 607 can have differing angles. As shown in FIG. 9, one of the outer hooks 607 can extend from the angled portion 609. The outer hooks 607 can have an angle of about 30, 35, 40, 45, 50, or 50 degrees from the top surface 601. The outer hooks 607 can have an angle of greater than about 30, 35, 40, 45, 50, or 50 degrees from the top surface 601. The outer hooks 607 can have an angle of less than about 30, 35, 40, 45, 50, or 50 degrees from the top surface 601.

The protrusion 606 and outer hooks 607 can be configured to be releasably retained around/within the frame 110. In some embodiments, the gasket 600 can be held to the frame 110 by friction. In some embodiments, adhesives, such as tape, glue, epoxy, etc. can be used to attach the gasket 600 to the frame 110. In some embodiments, the interface connectors can extend the entire length of the gasket 200. In some embodiments, a number of each of the interface connectors can be used spaced along the length of the gasket 200.

Unlike the above-disclosed gaskets, gasket 600 may not have separate arms from a center stop 608. In some embodiments, the gasket 600 may include arms as discussed above.

The compression section 650 can include a v-shaped body 656 extending downwards away from the attachment section 604, the v-shaped body 656 forming an opening 660 (such as a generally triangular opening) extending through a full or partial length of the gasket 600. In some embodiments, the v-shaped body 656 can be located off-center, such as towards one of the hooks 607. The v-shaped body 656 can be generally centered under the attachment component 604 in some embodiments. A flange, such as arm 654 structure can extend away from the v-shaped body 656 towards the back end of the vehicle. An enlarged portion, such as ball 652 (e.g., ball-like structure, protrusion) can be generally on the tip of a v-shaped body 656. In some embodiments, the ball 652 and the arm 654 extend in the same lateral direction from the v-shaped boy 656, such as shown in FIG. 9. The ball 652 can extend towards the tailgate so that it abuts against an inner surface of the tailgate and compresses against the tailgate, such as shown in FIGS. 10A-10B. This ball 652 can improve the water sealability of the gasket 600 and can assist in assurance that a remote tailgate release, if the vehicle has one, functions properly. Thus, the compression section 650 can act as a bracing section.

In some embodiments, the ball 652 can be generally circular, such as shown in FIGS. 10A-10B. However, in some embodiments, the ball 652 may have a generally flat bottom as shown in FIG. 9, instead of the rounded bottom.

The arm 654 can include a fin 658 extending downward generally on the end of the arm 654. In some embodiments, the fin 658 can point generally to the ball 652. In some embodiments, the fin 658 can stop water from passing through. However, in some embodiments the fin 658 may just serve an aesthetic purpose for minimizing the perception of a large gap between the attachment section 604 and the tailgate.

In some embodiments, the compression section 650 and the attachment section 604 can be formed from the same material. In some embodiments, they can be formed from different materials. In some embodiments, the compression section 650 can be formed from a more bendable/flexible/crushable material whereas the attachment section 604 can be formed of a denser/harder material. For example, the compression section 650 can be formed of ethylene propylene diene monomer (EPDM) sponge. Further, the rest of the gasket 600 can be formed of dense EPDM. In some embodiments, the material for the components are rubbers, polymers, etc. and the particular material does not limit the disclosure. In some embodiments, the material for the components are rubbers, polymers, etc. and the particular material does not limit the disclosure.

In some embodiment the compression section 650 can be integrally formed with the attachment section 604. In some embodiments, the compression section 650 can be attached to the attachment section 604, such as through adhesive, mechanical fastening, etc. and the particular attachment means does not limit the disclosure.

FIGS. 10A-10B illustrate the modified side rail gasket 600 located on a vehicle in an uncompressed FIG. 10A and compressed FIG. 10B configuration. As shown, the gasket 600 can fit between a side of a frame of a tonneau cover 110 and the vehicle tailgate 112. The gasket 600 can extend the length of the tonneau cover frame 110, or a majority of the length of the tonneau cover frame 110. In some embodiments, the gasket 600 can extend approximately 80%, 90%, 95%, 98%, 99%, or 100% of the frame 110 length. In some embodiments, the gasket 600 can extend greater than approximately 60%, 70, 80%, 90%, 95%, 98%, or 99% of the frame 110 length. In some embodiments, the gasket 600 can extend less than approximately 70%, 80%, 90%, 95%, 98%, 99%, or 100% of the frame 110 length. In some embodiments, a plurality of gaskets 600 can be used under the tailgate 112, for example spaced apart.

As shown in FIG. 9, the gasket 600 can also include adhesive 674, such as tape, on its top side to help connect to a side rail. In some embodiments, an adhesive may not be used. In some embodiments, the adhesive 674 may allow the gasket 600 to be removed from the side rail. In some embodiments, the adhesive 674 permanently attaches the gasket 600 to the side rail. In some embodiments, there can be adhesive 674 on a bottom side to help connect to the frame of the vehicle.

In some embodiments, one strip of adhesive 674 can be used on the top of the gasket 600. In some embodiments, two strips of adhesive 674 can be used, such as shown in FIG. 9. The adhesive 674 can be located on opposite sides of the outside protrusion 606 spaced apart on the width of the gasket 600.

In some embodiments, the adhesive 674 can extend approximately 80%, 90%, 95%, 98%, 99%, or 100% of the gasket 600 length. In some embodiments, the adhesive 674 can extend greater than approximately 60%, 70, 80%, 90%, 95%, 98%, or 99% of the gasket 600 length. In some embodiments, the adhesive 674 can extend less than approximately 70%, 80%, 90%, 95%, 98%, 99%, or 100% of the gasket 600 length.

From the foregoing description, it will be appreciated that an inventive tonneau cover gaskets are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A tonneau cover for a vehicle, the tonneau cover comprising:
   a frame;
   a cover connected to the frame; and
   a gasket configured to be positioned between at least a portion of the frame and a portion of the vehicle and further configured to reduce liquid passage between the at least the portion of the frame and the portion of the vehicle, the gasket comprising:
      a length;
      an attachment portion configured to connect with the at least the portion of the frame, the attachment portion comprising a first portion, a second portion, and a third portion positioned between the first and second portions and having a greater thickness than both of the first and second portions, the first portion, the second portion, and the third portion extending along the length of the gasket; and
      a compression portion connected to the attachment portion and configured to be positioned between the attachment portion and the portion of the vehicle when the gasket is in use, wherein the compression portion comprises a first bulb and a second bulb, the first and second bulbs being separated by the third portion of the attachment portion, each of the first and second bulbs comprising a hollow passage extending along the length of the gasket.

2. The tonneau cover of claim 1, wherein, when the gasket is compressed between the at least the portion of the frame and the portion of the vehicle, the hollow passage of each the first and second bulbs of the compression portion changes shape.

3. The tonneau cover of claim 1, wherein the attachment portion comprises at least one interference connector configured to connect to the at least the portion of the frame.

4. The tonneau cover of claim 1, wherein the attachment portion is less compressible than the compression portion.

5. The tonneau cover of claim 1, further comprising at least one adhesive strip positioned on the attachment portion, the at least one adhesive strip configured to secure the attachment portion to the at least the portion of the frame.

6. The tonneau cover of claim 1, wherein each of the first and second bulbs comprises a first wall, a second wall, and a third wall between the first and second walls, the first and second walls connected to the attachment portion, and wherein, the first, second, and third walls define the hollow passage.

7. A gasket configured to improve liquid sealing for a tonneau cover, the gasket comprising:
   a length;
   an attachment portion extending along the length of the gasket and comprising a first material; and
   a compression portion connected to the attachment portion and comprising a second material, wherein the second material is more compressible than the first material, wherein the compression portion further comprises a first bulb and a second bulb, the first and second bulbs being spaced apart from one another, each of the first and second bulbs comprising a hollow passage extending along the length of the gasket;

wherein the attachment portion comprises a first portion, a second portion, and a third portion positioned between the first and second portions and having a greater thickness than both of the first and second portions, the first portion, second portion, and third portion extending along the length of the gasket.

8. The gasket of claim 7, wherein the attachment portion comprises at least one interference connector configured to connect to a portion of the tonneau cover.

9. The gasket of claim 7, wherein each of the first and second bulbs comprises a first wall, a second wall, and a third wall connected to the first and second walls, the first and second walls connected to the attachment portion, and wherein, the first, second, and third walls define the hollow passage.

10. The gasket of claim 7, wherein the first and second bulbs are separated by the third portion of the attachment portion.

11. The gasket of claim 7, wherein the first and second materials comprise rubber.

12. A tonneau cover for a vehicle, the tonneau cover comprising:
    a frame;
    a cover connected to the frame; and
    a gasket configured to be positioned between at least a portion of the frame and a portion of the vehicle and further configured to reduce liquid passage between the at least the portion of the frame and the portion of the vehicle, the gasket comprising:
        a length;
        an attachment portion configured to connect with the at least the portion of the frame, the attachment portion comprising a first portion, a second portion, and a third portion positioned between the first and second portions and having a greater thickness than both of the first and second portions, the first portion, second portion, and third portion extending along the length of the gasket; and
        a compression portion configured to be positioned between the attachment portion and the portion of the vehicle when the tonneau cover is in use, wherein the compression portion comprises at least one bulb comprising a hollow passage extending along the length of the gasket.

13. The tonneau cover of claim 12, wherein the third portion of the attachment portion comprises a width and wherein the at least one bulb is connected to opposite ends of the width of the third portion of the attachment portion.

14. The tonneau cover of claim 12, wherein, when the gasket is compressed between the at least the portion of the frame and the portion of the vehicle, the hollow passage of the at least one bulb of the compression portion changes shape.

15. The tonneau cover of claim 12, wherein the attachment portion comprises at least one interference connector configured to connect to the at least the portion of the frame.

16. The tonneau cover of claim 12, wherein the attachment portion is less compressible than the compression portion.

17. The tonneau cover of claim 12, wherein the compression portion is adhered to the attachment portion.

18. The tonneau cover of claim 12, wherein the at least one bulb comprises a first bulb and a second bulb, the first and second bulbs being separated by the third portion of the attachment portion.

19. The tonneau cover of claim 18, wherein each of the first and second bulbs comprises a first wall, a second wall, and a third wall between the first and second walls, the first and second walls connected to the attachment portion, and wherein, the first, second, and third walls define the hollow passage.

* * * * *